United States Patent [19]

Duret

[11] Patent Number: 4,829,958
[45] Date of Patent: May 16, 1989

[54] DEVICE AND METHOD FOR INTRODUCING PRESSURIZED GAS INTO A COMBUSTION CHAMBER OF A RECIPROCATING INTERNAL COMBUSTION ENGINE

[75] Inventor: Pierre Duret, Saint-Germain, France

[73] Assignee: Institut Francais du Petrole, Rueil-Malmaison, France

[21] Appl. No.: 947,752

[22] Filed: Dec. 30, 1986

[30] Foreign Application Priority Data

Dec. 30, 1985 [FR] France .................. 85 19432

[51] Int. Cl.⁴ .................. F02B 29/02; F02B 41/06
[52] U.S. Cl. .................. 123/316; 123/59 EC; 123/71 R; 123/433; 123/568
[58] Field of Search .................. 123/182, 316, 432, 26, 123/66, 70 R, 71 R, 74 R, 433, 532, 568, 59 EC

[56] References Cited

U.S. PATENT DOCUMENTS

| | | | |
|---|---|---|---|
| 1,312,460 | 8/1919 | Thorp | 123/316 X |
| 2,273,095 | 2/1942 | Fitch | 123/71 R |
| 2,796,054 | 6/1957 | Miller | 123/316 |
| 3,363,611 | 1/1968 | Von Seggern et al. | 123/433 X |
| 3,487,818 | 1/1970 | Dineen | 123/71 R |
| 3,895,614 | 7/1975 | Bailey | 123/74 R X |
| 4,084,556 | 4/1978 | Villella | 123/316 |
| 4,192,265 | 3/1980 | Amano et al. | 123/316 X |
| 4,237,832 | 12/1980 | Hartig et al. | 123/316 X |
| 4,332,229 | 6/1982 | Schuit | 123/71 R X |
| 4,478,180 | 10/1984 | Fujikawa et al. | 123/433 X |
| 4,538,569 | 9/1985 | Sugino et al. | 123/316 |

FOREIGN PATENT DOCUMENTS

| | | | |
|---|---|---|---|
| 0047121 | 3/1983 | Japan | 123/316 |
| 0122314 | 7/1983 | Japan | 123/316 |
| 01800722 | 10/1983 | Japan | 123/316 |

Primary Examiner—Willis R. Wolfe, Jr.
Attorney, Agent, or Firm—Antonelli, Terry & Wands

[57] ABSTRACT

A device and method for introducing pressurized gas into a combustion chamber of an engine. The device includes a duct and an intermittent obstruction member, with the placing the cylinder and the combustion chamber in communication via said obstruction member.

11 Claims, 1 Drawing Sheet

DEVICE AND METHOD FOR INTRODUCING PRESSURIZED GAS INTO A COMBUSTION CHAMBER OF A RECIPROCATING INTERNAL COMBUSTION ENGINE

BACKGROUND OF THE INVENTION

The present invention relates to a device and method for introducing a pressurized gas into a combustion chamber of a reciprocating internal combustion engine. The device and method of the invention, when they are applied to a controlled ignition engine, improve initiation of combustion and increase the combustion speed by introducing gas (air or carburetted mixture with possibly burnt gases) in the vicinity of the electrodes of the spark plug and the ignition time.

SUMMARY OF THE INVENTION

The device of the invention uses the pressure and possibly the pressure wave effects of the burnt gases during expansion in a cylinder for injecting a certain amount of air or carburetted mixture with possibly burnt gases in the neighborhood of the ignition spark plug of this same cylinder or of another cylinder.

Thus, the present invention relates to an internal combustion engine having a duct connected to the cylinder via an aperture or an orifice at one end and connected at the other end to an orifice opening into the combustion chamber in the vicinity of the spark plug.

This duct includes an obstruction means, such as a non return valve, located preferably close to the end of this duct opening into the combustion chamber.

This obstruction member only allows the gas to pass in the direction from the duct towards the combustion chamber.

In a preferred embodiment, the end of the duct opening into the combustion chamber is oriented so as to introduce the gases in the direction of the spark plug, this is not the case with the device described in the German Pat. No. DE 1 576 009.

With the device of the invention, a speed gradient is obtained about the electrodes of the spark plug which promotes initiation of combustion. Similarly, a concentration gradient of the charge is obtained in the vicinity of the electrodes of the spark plug when the gases coming from the duct opening into the cylinder are enriched with fuel.

In the cases where the two ends of the duct are on the same cylinder, the duct may be separated into two parts by a second obstruction member which also allows the gases to flow only in the same direction. Thus, the volume defined between the two obstruction members, in the second part of the duct which opens into the combustion chamber, may remain pressurized during the rest of the cycle until the compression phase of the next cycle and may serve as source of air or carburetted mixture injected under pressure.

In a variant, the first part of the duct which does not remain pressurized during the rest of the cycle (i.e. from the end of expansion to the beginning of compression) may be scavenged of the burnt gases which it may possibly comprise, by air or carburetted mixture sucked in through a non return member opening into the air or carburetted gas source just upstream of the obstruction member separating the duct into two parts.

The aperture, at the end of the duct on the cylinder side, may be preferably positioned on the cylinder and have a shape such that it promotes the use of the pressure of the burnt gases and possibly of the pressure wave effects.

Similarly, the position of the end opening into the combustion chamber and its geometry defining the shape and direction of the jet will be defined so as to obtain an improvement of combustion.

Still within the scope of the present invention, said duct in its sealed and pressurized part may include a fuel enrichment device.

The present invention may be applied to an engine having at least two cylinders. In this case, an orifice or port of one cylinder may be connected by the duct with an orifice opening into a combustion chamber of another cylinder.

The present invention also relates to a method for injecting air or a carburetted mixture at a pressure greater than the atmospheric pressure into an internal combustion engine.

This method is characterized in that a communication is established between the cylinder and the combustion chamber of the same cylinder or of a different cylinder in the case of multicylinder engines, for supplying this combustion chamber with pressurized air or carburetted mixture.

Generally, the present invention relates to a device for introducing pressurized gas into a combustion chamber of an internal combustion engine having at least one cylinder.

This device includes a duct and an intermittent obstruction member, said duct causing said cylinder and said combustion chamber to communicate with each other by said obstruction chamber. This cylinder has at least one spark plug. The axis of this duct at the level of the cylinder is directed towards the electrodes of the spark plug.

The present invention also relates to a method for introducing pressurized gas into a combustion chamber of an internal combustion engine having at least one cylinder, itself having at least one spark plug.

In this method, said cylinder is caused to communicate intermittently with said chamber and the gases coming from this communication are directed substantially towards the electrodes of said spark plug.

According to this method, an amount of gas having a mean pressure is collected in said cylinder during a fraction of the operating cycle of said cylinder and this amount of gas may be injected into said combustion chamber while there reigns therein a pressure less than said mean pressure and the cylinder corresponding to said chamber is in the compression phase.

BRIEF DESCRIPTION OF THE DRAWINGS

The advantages and characteristics of the invention will be clear from the rest of the description, given by way of non limitative example, with reference to the accompanying Figures in which.

DESCRIPTION OF THE PREFERRED EMBODIMENT

Figure 1:
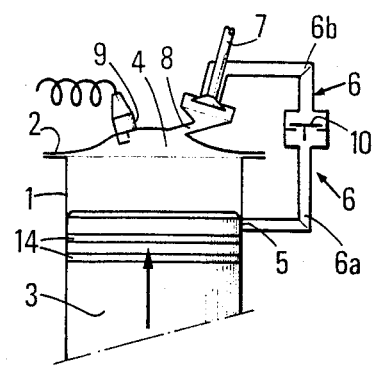
FIG. 1 shows schematically and in section an internal combustion engine equipped with the device of the invention.

FIG. 1 is shown schematically a section of a cylinder of an internal combustion engine equipped with the device of the invention.

Reference 1 designates the cylinder closed at its upper part by the cylinder head 2. In the cylinder moves piston 3 defining the combustion chamber 4.

A port 5 formed in the wall of cylinder 1 communicates with a duct shown schematically at 6.

An obstruction member 7, such as a valve (which may be controlled by a cam) or a non return valve closes the duct 6 at certain periods of the cycle upstream of orifice 8 opening into the chamber 4 in the vicinity of spark plug 9. The ducts supplying orifice 8 is oriented so as to direct the gases towards the electrodes of spark plug 9, as is shown by the arrow 8a in FIG. 2, which corresponds substantially to the axis of the duct 6 at the level of cylinder 1.

Thus a speed gradient is obtained about the electrodes of the spark plug which promotes the initiation of combustion. Furthermore when the gases coming from orifice 8 are enriched in fuel, a fuel concentration gradient is obtained about the electrodes of the spark plug, which is also favorable for initiating combustion. With such an arrangement, good operation of the engine is provided with an overall poor mixture or with a mixture diluted with recycled gases as takes place in some engines. Of course, such recycling of the combustion gases is totally independent of duct 6 which only transfers small amounts.

Figure 2:
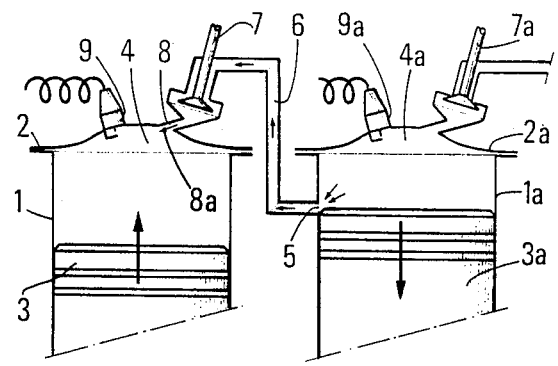
FIG. 2 shows the case of a multicylinder engine, FIG. 3 facilitates the understanding of the following Figures illustrating the operation of the engine.

FIG. 2 shows the device of the invention applied to the case of a multicylinder engine. Port 5 is formed in the wall of another cylinder designated by the reference 1a.

Duct 6 then connects this port 5 in cylinder 1a to the combustion chamber 4 of cylinder 1 via the obstruction member 7.

In the case of a monocylinder (FIG. 1) duct 6 may be divided into two parts 6a and 6b by a second obstruction or non return device 10. The two obstruction members 7 and 10 thus isolate a pressurized volume 6b, no longer necessarily having the form of a duct.

Figure 3:
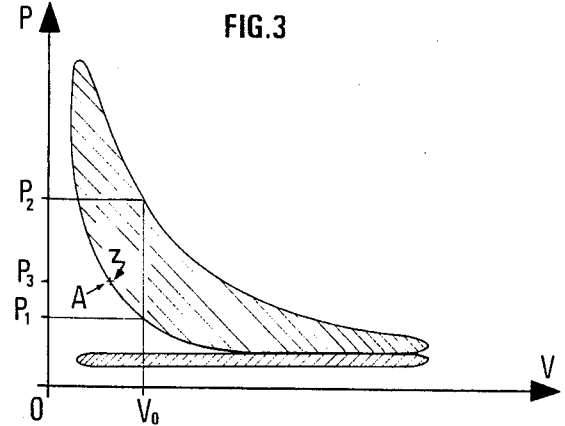

The diagram (PV) of FIG. 3 shows that if VO is the volume of the combustion chamber 4 when piston 3 just closes port 5, the pressure in the combustion chamber 4 has the value P1 during the compression phase and the value P2 very much higher than P1 during the expansion phase, P2 being also appreciably greater than P3, pressure at the time of ignition.

Figure 4:
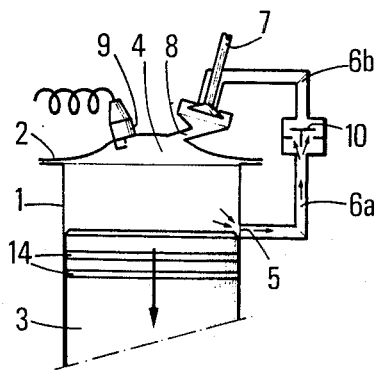
FIG. 4 illustrates the operation of the engine shown in FIG. 1.

The operation of the engine of FIG. 1 is described hereafter with reference also to FIG. 4.

In FIG. 1, the head piston ring 14 or piston 3 is in its compression phase and closes port 5. The pressure in chamber 4 is then equal to P1 according to FIG. 3. The result is that the volume 6a is filled with the gases from the cylinder at a pressure of about P1.

As will be explained further on in the description of the following Figures, volume 6b is at a pressure close to P2 (FIG. 3).

If the obstruction member 7 has not yet been opened, the second obstruction member 10 is theoretically closed.

The first obstruction member 7 may be opened during the compression before the ignition time. That may be before or after the time of the cycle of FIG. 1, as long as the pressure in chamber 4 does not exceed that of volume 6b. When this member is opened, a part of the contents of volume 6b (carburetted mixture with possibly burnt gases) is injected into chamber 4 in the vicinity of the ignition spark plug so as to create turbulences and stratification favorable to combustion.

The combustion takes place under good initiation and propagation conditions, piston 3 continues to rise and comes down again after the top dead point to arrive at the condition shown in FIG. 4 where it has just uncovered the port 5.

The combustion chamber is then at a pressure P2 (FIG. 3). On opening of the port, burnt gases at pressure P2 will push the gases from duct 6a into the volume 6b via the non return member which will open under the effect of the higher pressure and even the pressure wave effects related to the sudden opening of port 5.

Thus, with the obstruction member 7 closed, volume 6b will be filled at a pressure close to P2.

The following phases of the cycle should not modify the pressure in volume 6b, until the obstruction member 7 opens during the compression phase of the next cycle.

The above described operating steps are then reproduced in the same order.

FIG. 2 shows the case of an engine having several cylinders. By choosing two cylinders 1 and 1a with a judicious angular stagger, when that is possible, we may find again the case shown in this FIG. 2. When port 5 is opened by piston 3a (cylinder 1a is in the expansion phase and cylinder 1 is in the compression phase), the burnt gases at a high pressure (FIG. 3) push the contents from duct 6.

If the obstruction member 7 is open, these contents may be injected into chamber 4 which is at a substantially lower pressure. This may be particularly advantageous if the angular stagger between cylinders is chosen so that cylinder 1 is in its compression phase.

Moreover, in the case where the obstruction member 7 is an automatic non return member, such as a valve, during the compression phase of cylinder 1a when cylinder 1 is in the suction phase, the burnt gases which duct 6 may contain following the above described injection taking place during the preceding cycle, may be scavenged by the fresh gases enclosed in cylinder 1a. Thus, before the injection already described, duct 6 might then contain practically only fresh gases. The same goes if the obstruction member 7 is a member controlled for opening both during this phase for scavenging duct 6 and during the injection phase.

Generally, in accordance with the present invention, the obstruction member 7 is open when the cylinder which it equips is in the compression phase or at the end of compression and the energy which will serve for transferring the gases contained in duct 6 derives from the pressure difference P2−P1 (cf. FIG. 3) between the gases under expansion in one cylinder (P2) and under compression in another cylinder (P1) or of the same cylinder (P1).

A variant of the invention consists in adding to the engine shown in FIG. 1, to duct 6a in the vicinity of the non return member 10, an auxiliary duct 11 opening into a gas source for example free air, into an air filter or into a carburetted mixture supply member (carburetor for example) through orifice 12.

Figure 5:
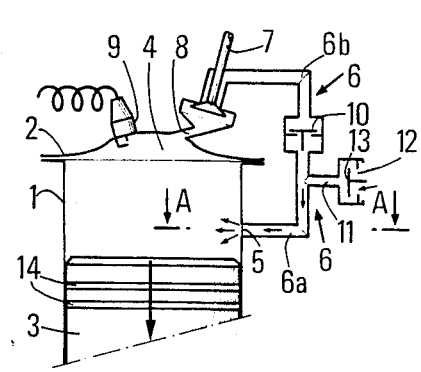
FIG. 5 illustrates a variant of the device.

Orifice 12 is equipped with a non return member 13 which may for example be a valve. Thus, during the intake phase shown in FIG. 5, the burnt gases which might have penetrated into duct 6a are scavenged by gases coming from this source and which are preferably fresh gases sucked in from the outside through orifice 12.

Still within the scope of the invention, a fuel enrichment member may be disposed at a position situated along duct 6, in the case using a single cylinder, as in the case of combinations with several cylinders.

Of course, in this case, the essential part of the fuel is fed into the cylinder through one of the means. This may be achieved more particularly by using a carburetor or by injecting fuel into the intake pipes of the engine.

Figure 6:
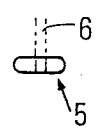
FIGS. 6 and 7 illustrate a detail of construction of the port and its connection with a duct.
Figure 7:
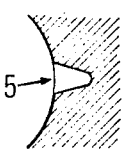

To benefit from a maximum pressure wave effect on opening of port 5, this latter and its connection with duct 6 may be given an appropriate shape for increasing these effects. One example is shown in FIG. 6 and 7 using a convergent form. FIG. 7 shows the section AA of FIG. 5. FIG. 6 shows the shape of the port 5 such as it would be seen by an observer situated inside the cylinder.

Finally, in the case of an application using connections between different cylinders (FIG. 2), the above described variants may be used, namely addition of an additional obstructional device 10 along duct 6 (application of FIG. 1) or the addition of a duct 11 and a non return device 12 and 13 in relation with a gas source or a combination of these two additional devices.

Moreover, generally, the purpose of duct 6 is not to inject the whole of the fuel into the engine but to promote the initiation of combustion by creating a speed gradient about the electrodes of the spark plug and/or by creating a concentration gradient about the electrodes of the spark plug while enriching it there with fuel. In this case, of course, duct 6 will have a fuel introduction member. Thus, at the moment when duct 6 directs its jet towards the electrodes of the spark plug 9 for promoting initiation of combustion, the cylinder normally contains an air and fuel mixture and is in addition in its compression phase. In a preferred embodiment, the obstruction member is closed just before the ignition signal energizes the spark plug, particularly in the case where the obstruction member is controlled.

Similarly, a fuel enrichment source could be placed along duct 6, the design of port 5 and its connection to duct 6 being adapted for increasing the pressure wave effects.

The present invention applies to all types of internal combustion engines with controlled ignition and it allows the control of the internal aerodynamics of the charge contained in the cylinders of the engine equipped with the device of the present invention.

In one embodiment of the present invention, the obstruction member 7 is in the open position when the cylinder which it equips is in the compression phase.

What is claimed is:

1. A method for introducing pressurized gas into a combustion chamber of an internal combustion engine having at least one cylinder, a duct and an intermittent obstruction member, said duct placing a cylinder defining a combustion chamber and said combustion chamber in communication via said obstruction member, said at least one cylinder having at least one spark plug, wherein an axis of the duct at a level of the at least one cylinder is directed towards electrodes of said at least one spark plug.

2. The device as claimed in claim 1, applied to an engine having at least two cylinders, wherein said duct places said combustion chamber in communication with the cylinder defining a combustion chamber in an arrangement such that said chamber and said cylinder defining a combustion chamber do not define the same combustion space.

3. The device as claimed in claim 1, applied to the case where said cylinder defining a combustion chamber and said combustion chamber define the same combustion space, wherein said duct has at least a second obstruction member situated in a duct portion between said cylinder defining a combustion space and said first obstruction member defining said portion into two volumes.

4. The device as claimed in claim 2, wherein said duct has a second obstruction member situated in the duct portion between said cylinder defining a combustion chamber and said first obstruction member dividing said portion into two volumes.

5. The device as claimed in one of claims 1, 2, 3 or 4, wherein said duct communicates via an auxiliary duct with a gas source, said auxiliary duct having a third obstruction member.

6. The device as claimed in claim 5, wherein said duct includes a fuel introduction member.

7. The device as claimed in claim 5, wherein the end of said duct connected to the cylinder defining a combustion chamber has a convergent shape adapted for collecting the pressure wave.

8. A method for introducing pressurized gas into a combustion chamber of an internal combustion engine having at least one cylinder, said at least one cylinder having at least one spark plug, wherein a cylinder defining a combustion chamber is placed intermittently in communication with a combustion chamber via a duct and the gases from this communication are directed substantially towards electrodes of said at least one spark plug.

9. The method as claimed in claim 8, wherein an amount of gas having a mean pressure is collected in said cylinder defining a combustion chamber during a fraction of the operating cycle of said cylinder defining a combustion chamber and this gas amount is injected into said combustion chamber while a pressure less than said mean pressure exist in said combustion chamber.

10. The method as claimed in one of claims 8 or 9, wherein said gas amount is collected during the expansion phase of the operating cycle of said cylinder defining a combustion chamber.

11. The method as claimed in claim 8, wherein said communication is formed at least during the compression phase of said cylinder defining a combustion chamber.

* * * * *